(12) United States Patent
Petricoin, Jr.

(10) Patent No.: US 6,493,435 B1
(45) Date of Patent: Dec. 10, 2002

(54) ALARM SYSTEM INTERFACE

(75) Inventor: Dennis M. Petricoin, Jr., Hemlock, NY (US)

(73) Assignee: Detection Systems, Inc., Fairport, NY (US)

( * ) Notice: Subject to any disclaimer, the term of this patent is extended or adjusted under 35 U.S.C. 154(b) by 0 days.

(21) Appl. No.: 09/544,015

(22) Filed: Apr. 6, 2000

(51) Int. Cl.[7] ............................................... H04M 11/00
(52) U.S. Cl. .................. 379/93.05; 379/37; 379/399.01
(58) Field of Search ...................... 379/37, 39, 399.01, 379/399.02, 413.02, 93.05, 93.08, 93.09, 93.28, 93.31, 28

(56) References Cited

U.S. PATENT DOCUMENTS

| | | | | |
|---|---|---|---|---|
| 6,028,919 A | * | 2/2000 | Bingel et al. | ............ 379/93.05 |
| 6,111,936 A | * | 8/2000 | Bremer | ......................... 379/28 |
| 6,115,466 A | * | 9/2000 | Bella | ........................... 379/399 |
| 6,137,880 A | * | 10/2000 | Bella | ......................... 379/399 |
| 6,144,735 A | * | 11/2000 | Bella | ....................... 379/93.05 |

* cited by examiner

Primary Examiner—Stella Woo
(74) Attorney, Agent, or Firm—Brian B. Shaw, Esq.; Stephen B. Salai, Esq.; Harter, Secrest & Emery LLP

(57) ABSTRACT

An interface for connecting an alarm system control panel and one or more telephone sets to a special telephone line is disclosed, wherein the interface includes a filter connected in series between the special telephone line and an alarm system control panel for removing special signals from the special telephone line, a controllable switch connected to the filter and the special telephone line for selectively enabling and disabling the filter, and a control circuit connected to the controllable switch for enabling the filter when the alarm system control panels goes off hook.

17 Claims, 5 Drawing Sheets

ALARM SYSTEM INTERFACE

FIELD OF THE INVENTION

This invention relates generally to alarm systems and more particularly to an interface device for connecting an alarm system control panel to a special phone line.

BACKGROUND OF THE INVENTION

Some residential and commercial alarm systems are connected to a telephone line so that an alarm condition can be transmitted to a monitoring facility and an appropriate response can be initiated. Most present day alarm systems have control panels that are designed to connect to conventional analog telephone lines. Increasingly, special telephone services such as xDSL are installed that carry signals at frequencies higher than those used for normal analog telephone connections. The signals on these non-standard telephone lines may interfere with the operation of analog alarm system control panels.

As used herein, a special telephone line is a telephone line that carries signals other than or in addition to conventional analog telephone signals, and particularly signals that would interfere with the operation of a conventional DACT. Special signals means those signals carried by a special telephone line that would, if not removed, interfere with the operation of an alarm system control panel DACT.

Most alarm system control panels use an industry standard Digital Alarm Communicator Transmitter (DACT) to interface with the telephone line. Standard DACTs were designed prior to the widespread introduction of special phone lines such as xDSL. The signals appearing on these non-standard lines are known to interfere with the proper operation of DACTs and, therefore, with the proper operation of the alarm system control panel. Filters have been developed for connection between a special telephone line and analog devices. Such filters can be connected between the alarm system control panel DACT and a special telephone line for removing special signals that would otherwise interfere with the operation of the DACT. The filters effectively address the problems created by special telephone lines in some premises wiring configurations, but create additional problems in others. When a telephone line splitter is used to connect the incoming telephone circuit to a DSL modem connected to one port and a filter and analog telephone sets connected to another port, an alarm system control panel can be connected between the filter and the telephone sets and operate normally. Similarly, when a combination DSL modem/ splitter is used to provide a network connection and an analog connection, the control panel can be connected in series with the analog telephone sets and connected to the analog connection of the DSL modem/splitter.

Another arrangement creates additional problems, however. Many prewired premises telephone lines are "daisy chained" from one phone outlet to the next. A DSL modem can be connected directly to any phone jack to provide a data connection to a personal computer or the like. Each analog telephone set requires a filter between it and a phone outlet. The alarm panel cannot be connected between one of these filters and a phone because such an arrangement would permit other analog telephone sets connected to other outlets to interrupt the operation of the alarm panel. The alarm panel must be wired ahead of all of the analog telephones. To do so in the daisy chain arrangement, however, would connect the alarm panel to the telephone line ahead of any filtering and, as already discussed, this would create problems with special signals being applied to the control panel DACT, resulting in unreliable operation.

It is an object of this invention to provide apparatus and an arrangement for allowing an alarm system control panel to be effectively connected to a special telephone line in a premises wired in a daisy chain configuration, without rewiring the entire premises.

It is another object of this invention to provide an interface for an alarm system control panel that allows the control panel to be connected to a special telephone line upstream from a plurality of daisy chained house telephones and a DSL modem.

SUMMARY OF THE INVENTION

Briefly stated, in accordance with the presently preferred embodiment of the invention, an interface for connecting an alarm system control panel and one or more telephone sets to a special telephone line includes a filter connected in series between the special telephone line and an alarm system control panel for removing special signals from the special telephone line, a controllable switch connected to the filter and the special telephone line for selectively enabling and disabling the filter, and a control circuit connected to the controllable switch for enabling the filter when the alarm system control panels goes off hook.

In accordance with another aspect of the invention, the alarm system control panel includes a port for connecting one or more telephone sets and one or more special devices such as a DSL modem to the telephone line.

In accordance with still another aspect of the invention, the control circuit includes first and second current sensors for sensing current in the connection between the alarm system control panel and the special telephone line on the one hand and current between the alarm system control panel and the one or more telephone sets and one or more special devices on the other hand.

In accordance with still another aspect of the invention, the control circuit is responsive to current flowing from the special telephone line to the control panel and the absence of current flowing from the alarm system control panel to the one or more telephone sets and one or more special devices to enable the filter.

In accordance with a still further aspect of the invention, the current sensors comprise optoisolators.

The novel aspects of the invention are set forth with particularity in the appended claims. The invention itself, together with further objects and advantages, may be more readily understood by reference to the following detailed description of a presently preferred embodiment of the invention taken in conjunction with the accompanying drawing in which:

DETAILED DESCRIPTION OF A PREFERRED EMBODIMENT

Figure 1:
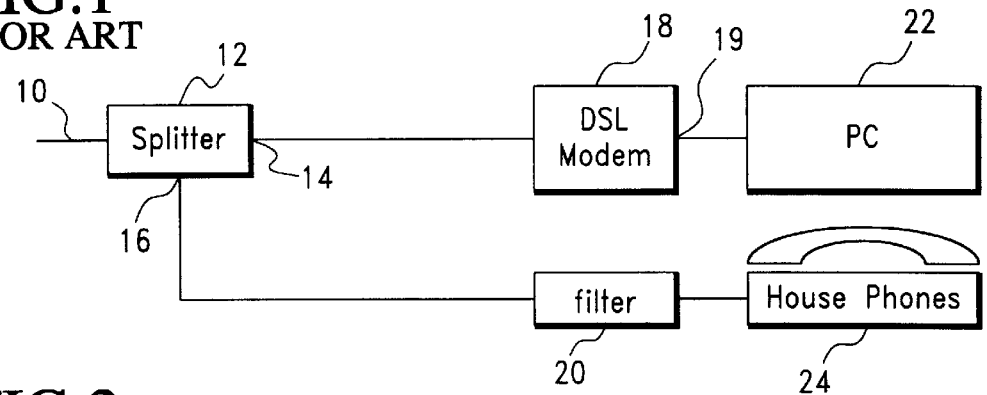
FIG. 1 is a block diagram of a premises wiring arrangement.

Referring now to FIG. 1, an incoming special telephone line 10 is connected to splitter 12 that has two outputs 14 and 16. The splitter does not remove or substantially alter any of the special signals on the special telephone line.

Figure 2:
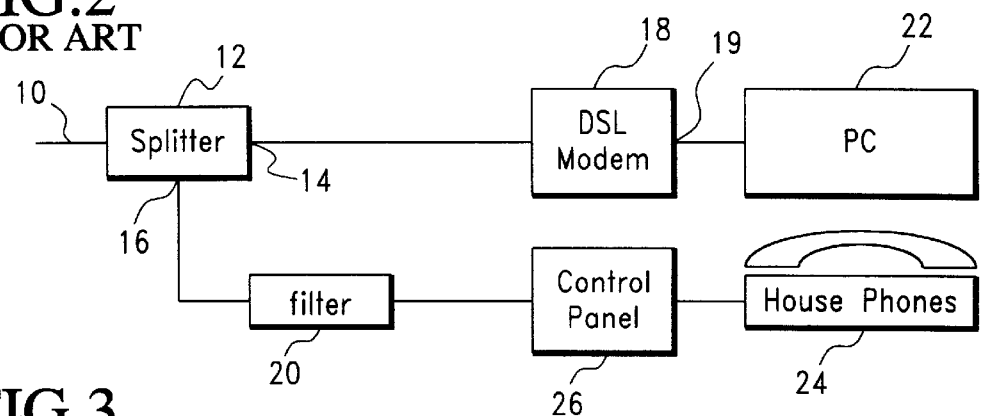
FIG. 2 is a block diagram of the premises wiring arrangement of FIG. 1 showing the connection of an alarm control panel therein.

Output 14 is connected to a digital subscriber line modem 18 having a data output 19 connected to a personal computer 22 or similar data device. The other output 16 of splitter 12 is connected to a filter 20 for removing the special signals and one or more telephone sets 24 is connected to filter 20. The arrangement shown in FIG. 1 can easily accommodate an alarm system control panel as shown in FIG. 2. In this figure, and in the other figures, like reference numerals denote like elements. Control panel 26 is connected between filter 20 and telephone set 24. When the control panel goes off hook, telephone sets 24 are automatically disconnected. Filter 20 is permanently connected between control panel 26 and special line 10 and removes any special signals appearing on the line before they can adversely affect the control panel.

Figure 3:
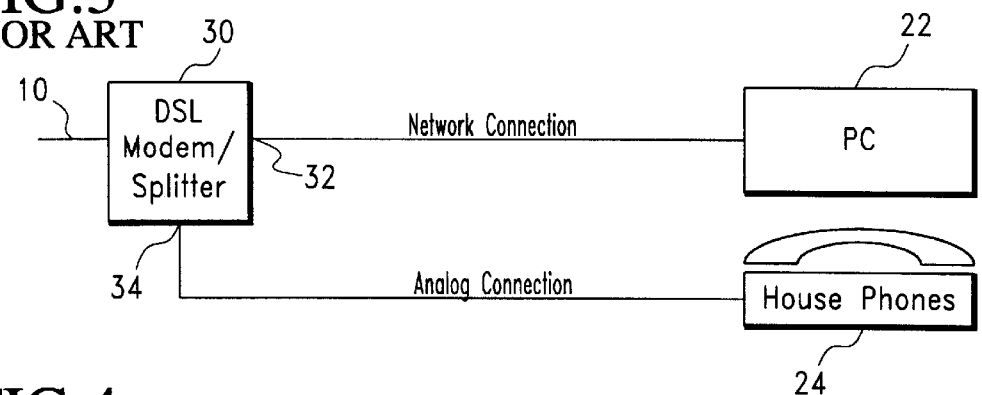
FIG. 3 is a block diagram of another premises wiring arrangement.

FIG. 3 shows another premises wiring arrangement. Special line 10 is connected to an input of a digital subscriber line modem/splitter having outputs 32 and 34. Output 32 carries the data portion of the connection while output 34 carries the analog portion. The modem/splitter includes a modulator-demodulator for converting data appearing at input/output 32 to and from the special signals carried by the special telephone line. Output 34 is a prefiltered analog connection to one or more telephone sets.

Figure 4:
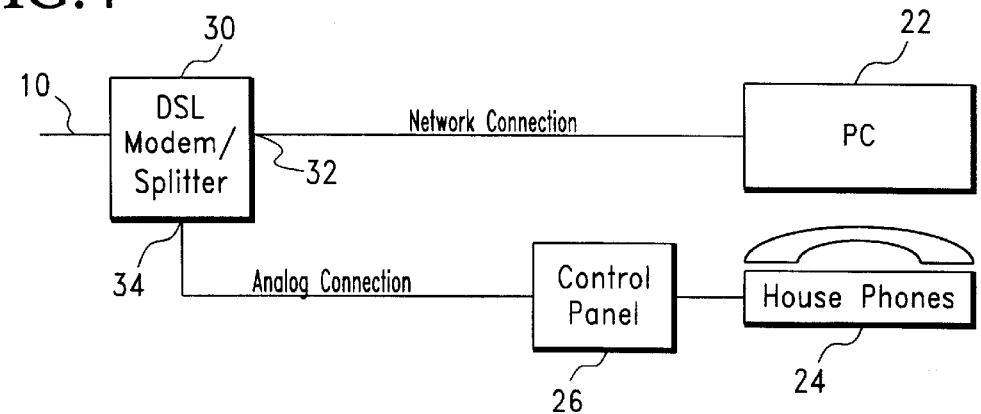
FIG. 4 is a block diagram showing the addition of an alarm system control panel to the arrangement of FIG. 3.

As shown in FIG. 4, an analog control panel can be easily integrated into the arrangement shown in FIG. 3. Control panel 26 can simply be inserted between output 34 of the DSL modem/splitter 30 and one or more telephone sets 26. When a control panel seizes the line, the telephone sets are automatically disconnected and the control panel is connected to the special telephone line 10 by way of DSL modem/splitter 30.

Figure 5:
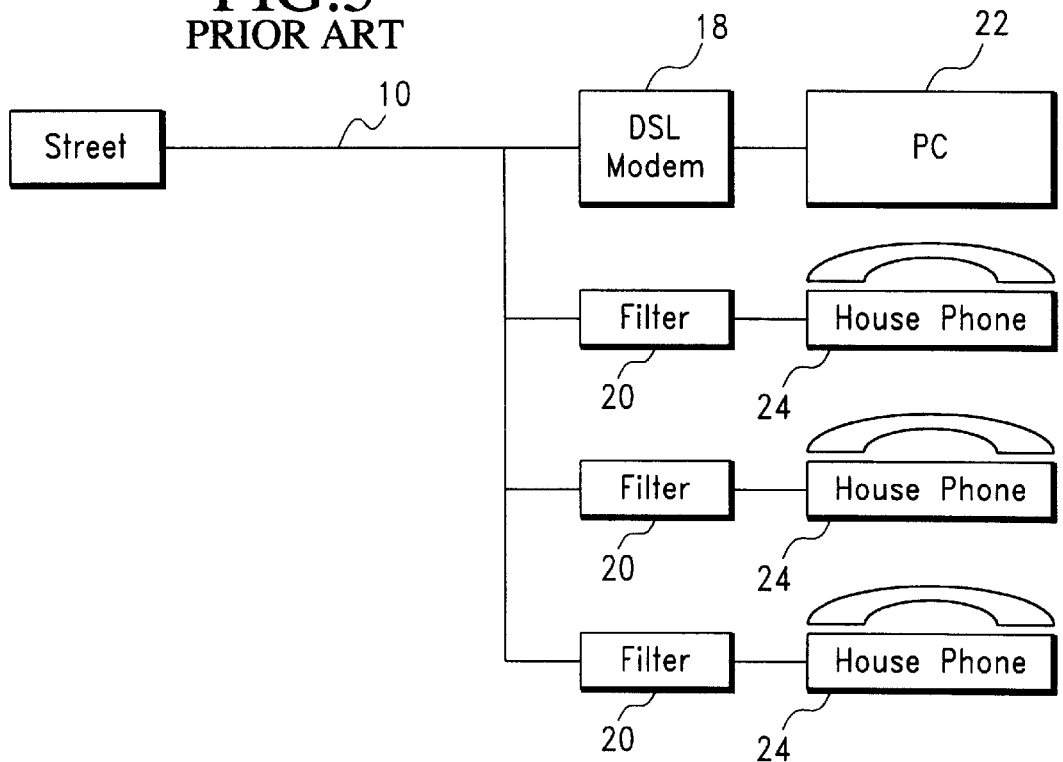
FIG. 5 is a block diagram of yet another premises wiring configuration.

FIG. 5 shows a premises wiring arrangement of the type to which this invention is specifically addressed. A special telephone line 10 is connected in parallel to a digital subscriber line modem 18, and a plurality special signals filters 20, and telephone sets 24. This arrangement does not lend itself to the addition of an alarm signal control panel. The control panel cannot be placed between one of the filters 20 and telephone sets 24. Doing so would leave the other filters and telephone sets 24 connected to the telephone line 10 ahead of the alarm system control panel, thereby potentially disrupting its operation, which is not tolerable. The alarm system control panel cannot be connected in series with special telephone line 10 between the street and the parallel combination of the DSL modem 18 and special signal filter 20 because it would then be subjected to the special signals and potentially rendered inoperable. The alarm system control panel cannot be connected in series with a filter and the combination connected in series with special line 10 because doing so would filter the special signals before they reached the DSL modem 18, thus rending it ineffective.

Figure 6:
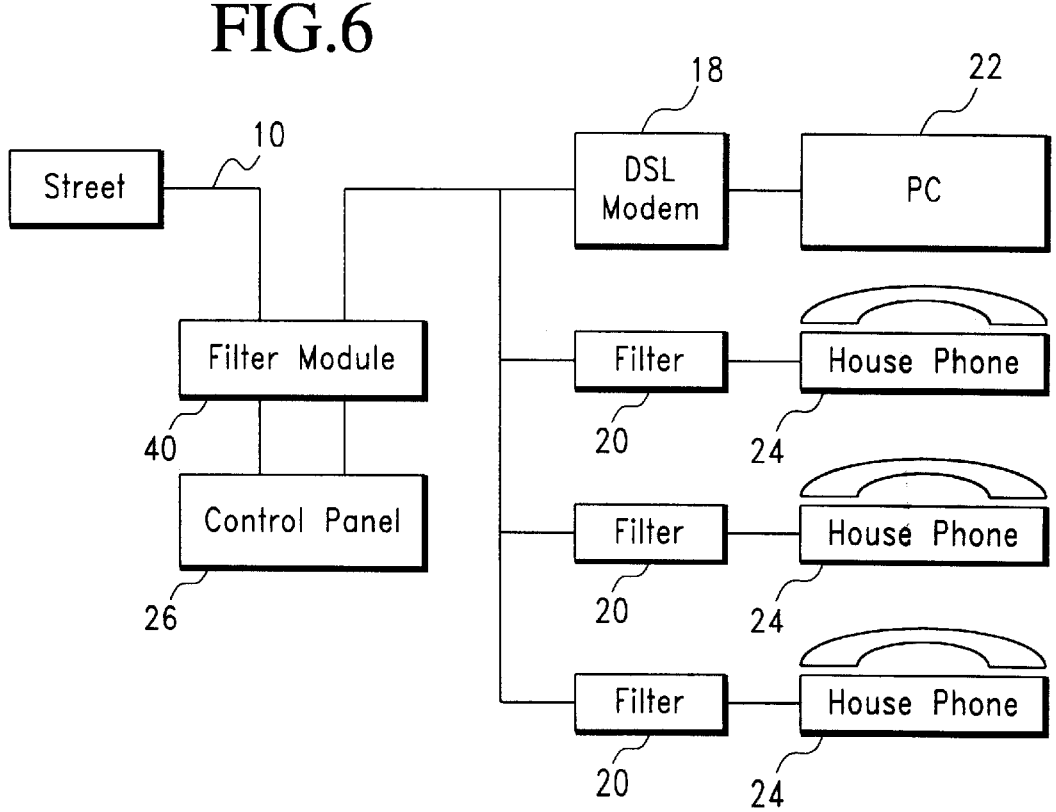
FIG. 6 is a block diagram showing the addition of an alarm system control panel with an interface circuit in accordance with this invention to the arrangement of FIG. 5.

An arrangement in accordance with this invention for overcoming these problems is shown in FIG. 6. A switchable filter module interface 40 is connected in series with special telephone line 10 and the alarm system control panel 26 is connected to interface 40. The output of interface 40 is connected to the parallel combination of DSL modem 18 and filters 20.

Figure 7:
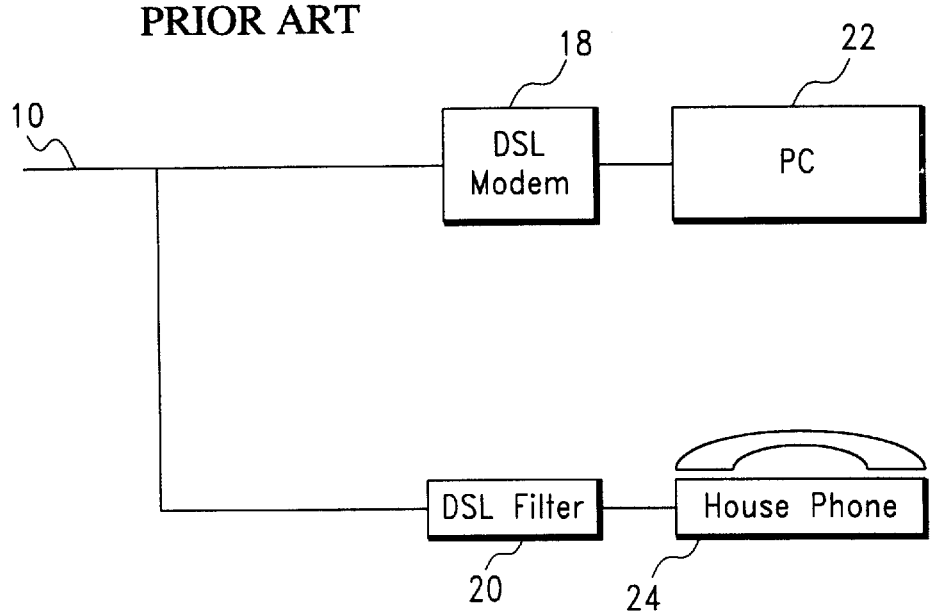
FIG. 7 is a block diagram of still another premises wiring configuration.
Figure 8:
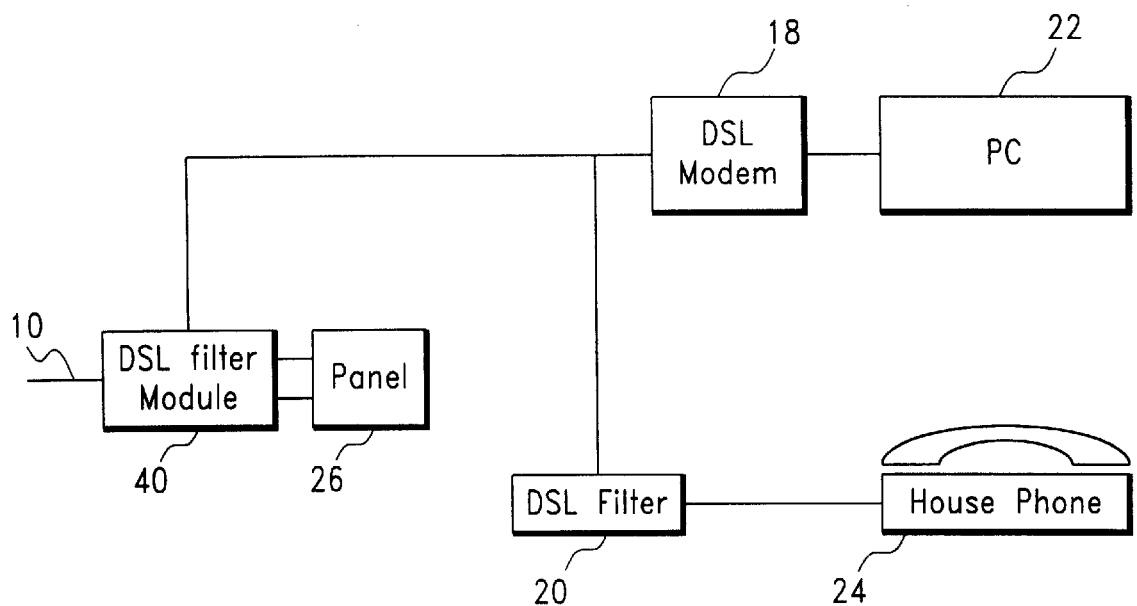
FIG. 8 is a block diagram of an alarm system control panel and interface circuit in accordance with this invention connected to the arrangement shown in FIG. 7.
Figure 9:
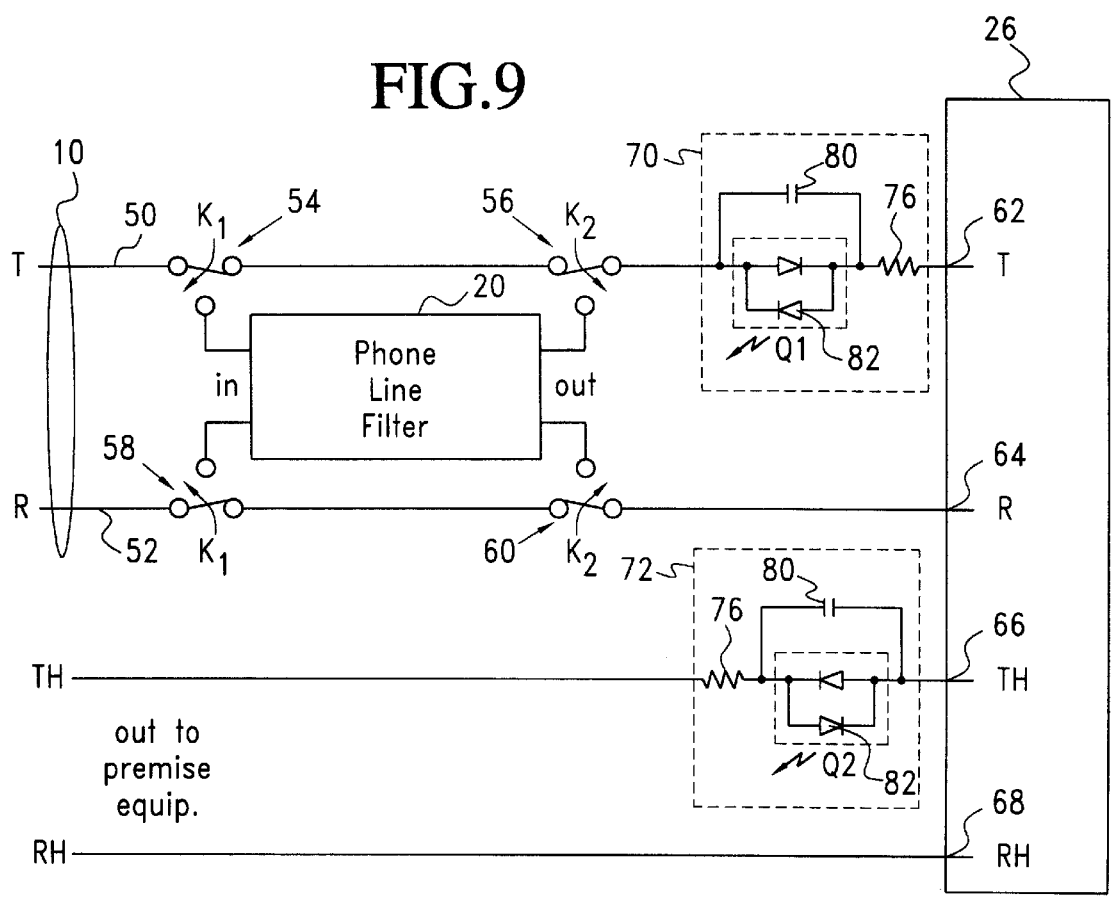
FIG. 9 is a schematic diagram of the interface between an alarm system control panel, an incoming special telephone line and on premises telephone sets in accordance with this invention.
Figure 10:
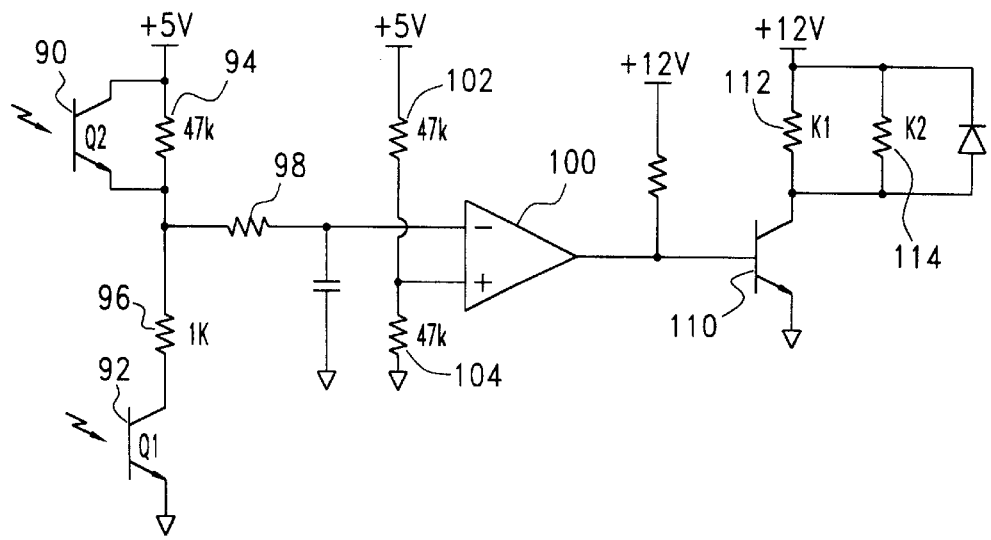
FIG. 10 is a schematic diagram of a control circuit for use with the arrangement shown in FIG. 9.

FIG. 7 shows another premises wiring arrangement to which this invention provides a solution. Special telephone line 10 is connected in parallel to DSL modem 18 and DSL filter 20. The output of DSL modem 18 is connected to a personal computer or other data device 22, and the output of DSL filter 20 is connected to a telephone set 24. The addition of an alarm system control panel to this arrangement is substantially similar to that shown in FIG. 6. An interface unit 40 is connected in series with special telephone line 10, and an alarm system control panel 26 is connected to interface unit 40. FIGS. 9 and 10 show the interface unit 40 and associated control circuit. Referring first to FIG. 9, special telephone line 10 includes a tip conductor 50 and a ring conductor 52. A DSL or special signal filter 20 of conventional design may be switched into and out of a series circuit connection with special telephone line 10 by switch contacts 54, 56, 58 and 60, which are preferably each single pole double throw relay contacts which are part of either two separate relays as shown, or if desired, part of a single four pole double throw relay. Alternatively, four relays may be used or the relay contacts may be replaced with solid state switching means.

As a further alternative, phone line filter 20 may be permanently connected in series with special telephone line 10 and a control signal used to selectively activate or deactivate the filter.

The special telephone line is connected to tip 62 and ring 64 inputs of conventional alarm system control panel 26. Tip 66 and ring 68 outputs of the alarm system control panel 26 are connected to other on-premises equipment and shown in FIG. 6, such as a DSL modem and one or more filters which in turn are connected to analog telephone sets.

A first current sensor 70 is connected in a series circuit relationship with the tip circuit of special telephone line 10 and a second current sensor 72 is connected in series circuit relationship with the tip conductor of the premises telephone line. Preferably, current sensors 70 and 72 are identical and include a series resistor 76, a bi-directional light emitting diode 82 and a shunt capacitor 80 connected across the series combination of resistor 76 and diode 82 which forms a portion of an optocoupler as will be described in more detail below. Referring now to FIG. 10, first and second phototransistors 90 and 92 are optically coupled but electrically isolated from light emitting diode 82 of current sensor 70 and light emitting diode 82 of current sensor 72 respectively. Phototransistor 90 is connected in parallel with a resistor 94. Phototransistor 92 is connected in series with a resistor 96. The emitter of phototransistor 92 is connected to ground, and the collector of phototransistor 90 is connected to a suitable power supply such as a five volt supply. Resistors 94 and 96 are connected together through resistor 98 to the input of comparator 100. The non-inverting input of comparator 100 is connected to a voltage divider comprising resistors 102 and 104 connected between +5 volts and ground to produce a voltage at the non-inverting input of approximately 2.5 volts. When phototransistor 90 turns on as a result of current passing through current sensor 70, the inverting input of comparator 100 goes high, turning off transistor 110. When phototransistor 92 is rendered conductive, the inverting input of comparator 100 goes to approximately 0 volts, causing the output of the comparator to go high, turning on transistor 110. Two relay coils, 112 and 114, are connected in parallel in the collector circuit of transistor 110. Coil 112 controls contacts 54 and 58, while coil 114 controls contacts 58 and 60.

The operation of control circuit 10 proceeds as follows. If current sensor 70 is triggered by current flowing in tip connection 50, while current sensor 72 is not triggered, thereby indicating the absence of current in the premises circuit, this indicates that only the alarm system control panel 26 has gone off hook, and transistor 110 is turned on, and filter 20 is inserted in series with the special telephone line. If current is detected by detector 72, indicating that the premises equipment is off hook, transistor 110 is turned off, relay coils 112 and 114 are de-energized, and filter 20 is taken out of series circuit relationship with special telephone line 10. If both current detectors 70 and 72 are turned on by the flow of current therethrough, filter 20 is switched out of the circuit. Essentially, the only situation where the filter 20 is switched in series circuit relationship with special telephone line 10 is when the alarm system control panel 26 is off hook but none of the other devices is off hook. The DACT in the alarm system control panel disconnects outputs 66 and 68 when the panel seizes the line.

Figure 11:
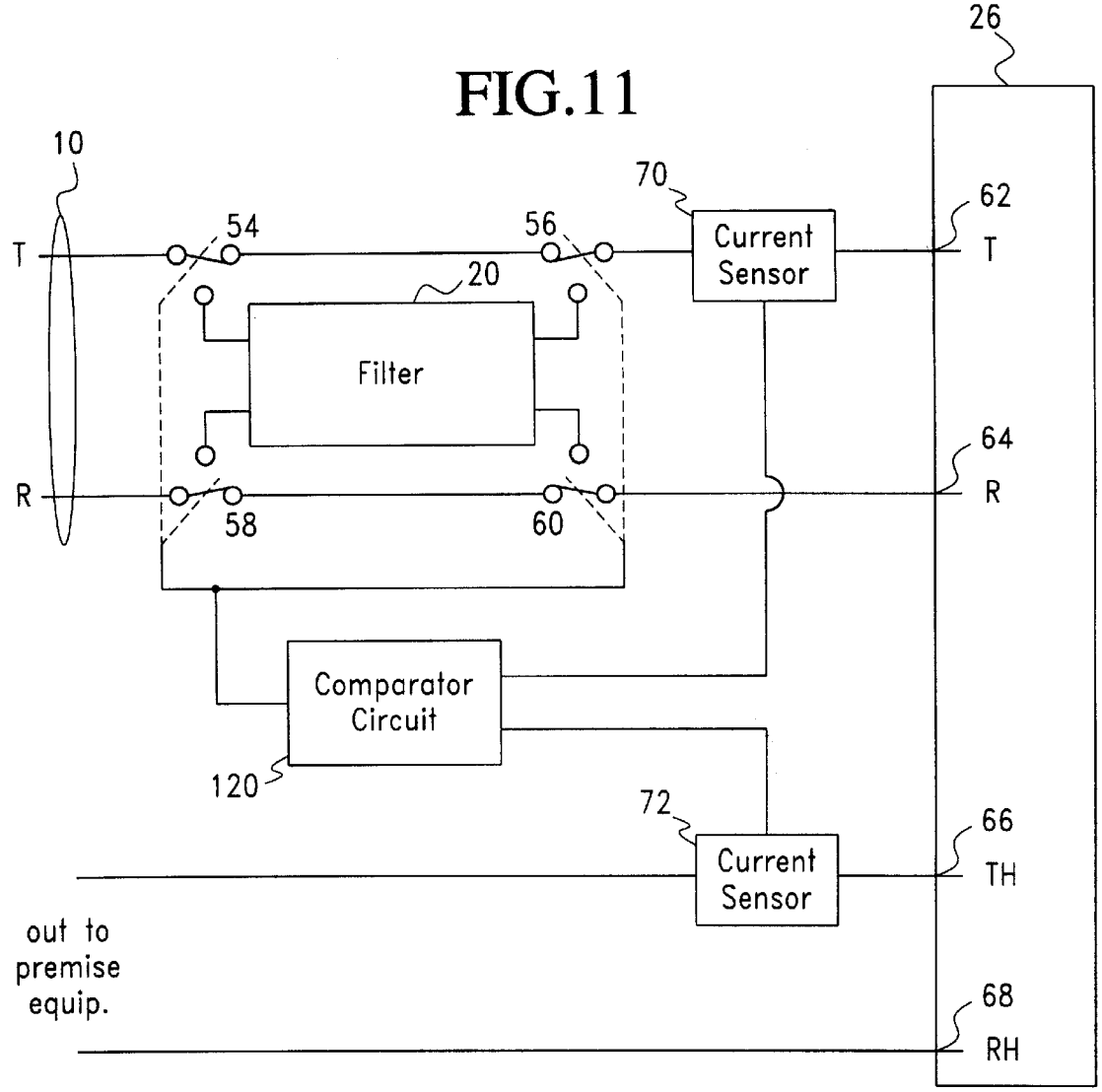
FIG. 11 is a block diagram of the interface between an alarm system control panel, an incoming special telephone line, and on-premises equipment in accordance with the invention.

FIG. 11 is a somewhat more general block diagram schematic of an alarm system control panel interface in accordance with this invention. Current sensors 70 and 72 are illustrated more generally and may be any sort of current sensor known to those skilled in the art, not limited to an opto-coupler type sensor as already described. For example, a transformer-based current sensor may be employed, a small series resistor together with a voltage sensor may be employed, or any other device capable to detecting the currents, normally on the order of 10s to the low 100s of millamps, created by telephone sets and similar equipment. Comparator circuit 120 can be any circuit that is responsive to the outputs of current sensors 70 and 72 to control relay contacts 54–60 to switch filter 20 in series circuit relationship with special line 10 when control panel 26 goes off hook and to switch filter 20 out of series circuit relationship with special line 10 when any of the premises equipment goes off hook.

While the invention has been described in connection with the presently preferred embodiment thereof, those skilled in the art will recognize that certain modifications and changes may be made therein without departing from the true spirit of the scope of the invention, which accordingly is intended to be defined solely by the appended claims.

What is claimed is:

1. An interface for connecting an alarm system control panel of the type that includes a port for connected one or more telephone sets to the alarm system control panel to a special telephone line, comprising:
   a filter connected in series between the special telephone line and an alarm system control panel for removing special signals from the special telephone line;
   a controllable switch connected to the filter the alarm system control panel and the special telephone line, for selectively connecting the filter in series between the special telephone line and the alarm system control panel, and bypassing the filter; and
   a control circuit connected to the alarm system control panel and the controllable switch for connecting the filter in series between the special telephone line and the alarm system control panel when the alarm system control panel goes off hook.

2. The interface of claim 1 in which the control circuit comprises a first current sensor for sensing current in the special telephone line.

3. The interface of claim 2 in which the control circuit comprises a second current sensor for sensing current flowing from the port for connecting one or more telephone sets, and one or more special devices to the alarm system control panel.

4. The interface of claim 3 in which the control circuit is responsive to current flowing in the special telephone line, and the absence of current flowing from the port, to enable the filter.

5. The interface of claim 4 in which the second current sensor comprises an opto-isolator.

6. The interface of claim 3 which the first current sensor comprises an opto-isolator.

7. The interface of claim 3 in which the control circuit comprises a comparator connected to the first and second current sensors.

8. An interface for connecting an alarm system control panel and one or more telephone sets to a special telephone line, comprising:
   a filter connected in series between the special telephone line and an alarm system control panel for removing special signals from the special telephone line;
   a controllable switch connected to the filter and the special telephone line, for selectively enabling and disabling the filter; and
   a control circuit connected to the controllable switch for enabling the filter when the alarm system control panel goes off-hook in which the alarm system control panel includes a port for connecting one or more telephone sets, and one or more special devices.

9. The interface of claim 8 which the control circuit comprises a first current sensor for sensing current in the special telephone line.

10. The interface of claim 9 which the first current sensor comprises an opto-isolator.

11. The interface of claim 9 in which the control circuit comprises a comparator connected to the first and second current sensors.

12. The interface of claim 9 in which the control circuit comprises a second current sensor for sensing current flowing from the port for connecting one or more telephone sets, and one or more special devices to the alarm system control panel.

13. The interface of claim 12 in which the control circuit is responsive to current flowing in the special telephone line, and the absence of current flowing from the port, to enable the filter.

14. The interface of claims 12 in which the second current sensor comprises an opto-isolator.

15. A method for isolating an alarm system control panel that is connected to a special telephone line and to one or more telephone sets from special telephone signals carried by the special telephone line, comprising the steps of;
   (a) providing a filter for removing the special telephone signals from the special telephone line;
   (b) connecting the alarm system control panel directly to the special telephone line while the alarm system control panel is on hook;
   (c) detecting when the alarm system control panel goes off hook; and
   (d) connecting the filter in series with the special telephone line when the detecting step indicates that the alarm system control panel has gone off hook.

16. The method of claim 15 in which the first detecting step comprises sensing the current flowing in the special telephone line.

17. The method of claim 15 further comprising second detecting when at least one of the telephone sets goes off hook, wherein the second detecting step comprises sensing the current flowing to the at least one of the telephone sets.

* * * * *